(No Model.)

G. W. RAVENSCROFT & N. L. MAGNUSSON.
SECTIONAL CAM.

No. 564,841. Patented July 28, 1896.

WITNESSES:
Edward Thorpe

INVENTORS
G. W. Ravenscroft
N. L. Magnusson
BY
ATTORNEYS.

United States Patent Office.

GEORGE WILLIAM RAVENSCROFT AND NILS LUDWIG MAGNUSSON, OF MOGOLLON, TERRITORY OF NEW MEXICO.

SECTIONAL CAM.

SPECIFICATION forming part of Letters Patent No. 564,841, dated July 28, 1896.

Application filed February 15, 1896. Serial No. 579,445. (No model.)

*To all whom it may concern:*

Be it known that we, GEORGE WILLIAM RAVENSCROFT and NILS LUDWIG MAGNUSSON, of Mogollon, in the county of Socorro and Territory of New Mexico, have invented a new and Improved Sectional Cam, of which the following is a full, clear, and exact description.

The invention relates to stamping-mills; and its object is to provide a new and improved sectional cam which is simple and durable in construction, arranged to permit of conveniently removing it for repairs, replacement by a new one, or other purposes, without disturbing the cam-shaft and the other cams thereon.

The invention consists principally of a two-part hub, each hub part carrying a cam-wing and a dovetailed arm fitting laterally into a dovetailed groove in the other cam-wing.

The invention also consists of certain parts and details and combinations of the same, as will be fully described hereinafter and then pointed out in the claims.

Reference is to be had to the accompanying drawings, forming a part of this specification, in which similar characters of reference indicate corresponding parts in all the figures.

Figure 1:
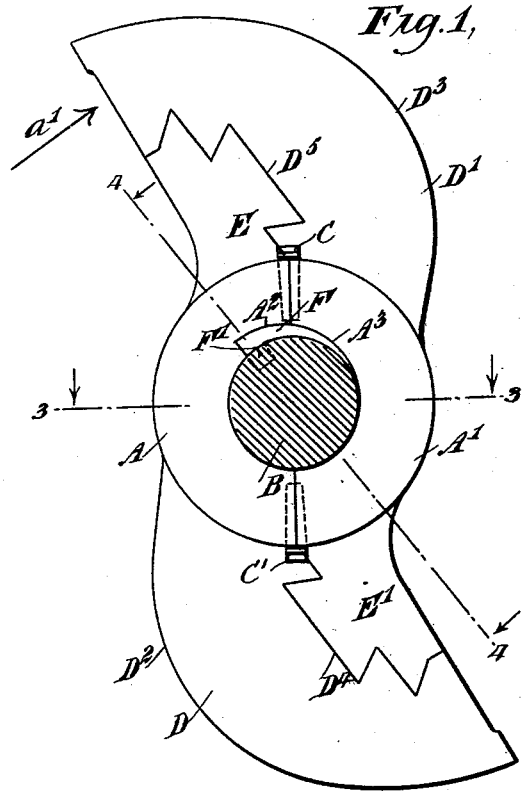
Figure 2:
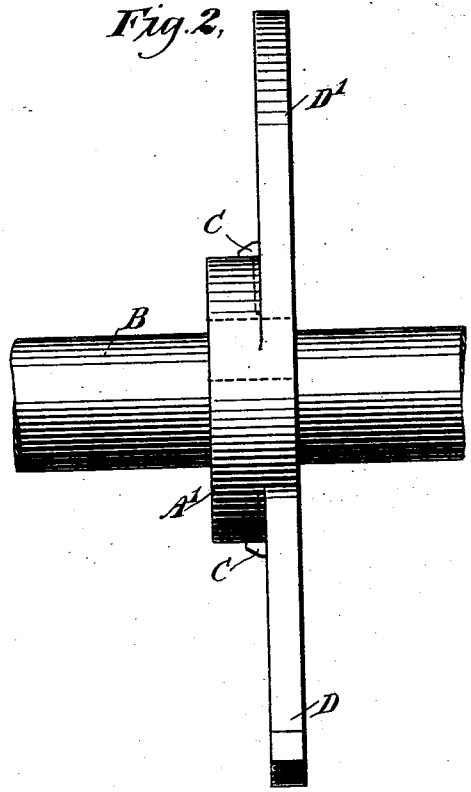
Figure 3:
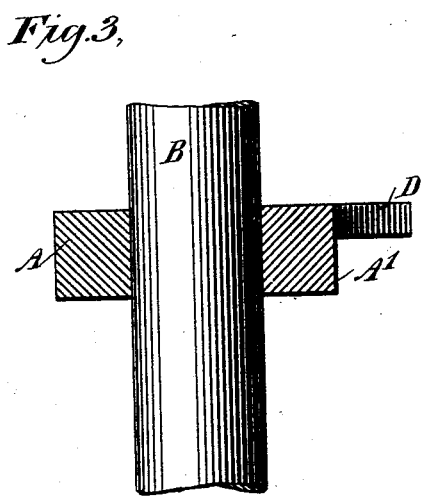
Figure 4:
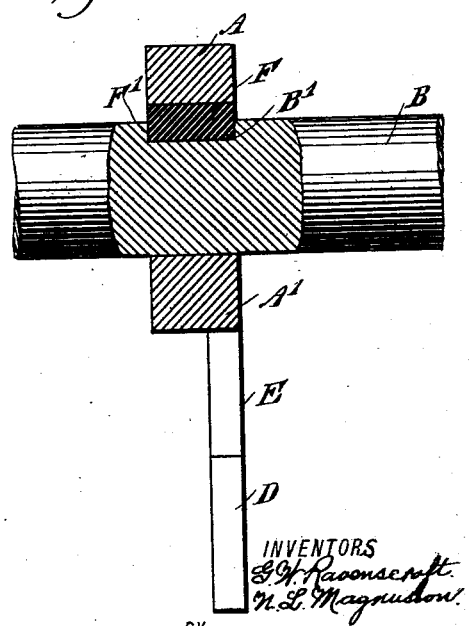

Figure 1 is a side elevation of the improvement as applied and with the cam-shaft in section. Fig. 2 is an end view of the same. Fig. 3 is a sectional plan view of the same on the line 3 3 of Fig. 1, and Fig. 4 is a similar view of the same on the line 4 4 of Fig. 1.

The improved sectional cam is provided with a hub made in two parts A A', fitted on a cam-shaft B, and adapted to be fastened together against lateral movement by keys C C', driven radially into the hub parts at their joint, as plainly indicated in Figs. 1 and 2. The hub parts A A' are provided with cam-wings D D', respectively, extending in opposite directions, and provided with working cam-surfaces $D^2$ and $D^3$, respectively, curved in the usual manner, to engage and disengage the arms of the stamp-rods, as is well known.

In the rear or non-working edges of the wings D and D' are formed laterally-extending dovetailed grooves $D^4 D^5$, respectively, of which the groove $D^4$ in the wing D is engaged by a dovetailed arm E', extending from the hub part A' opposite its wing D'. The other dovetailed groove, $D^5$, in the wing D' is engaged by a dovetailed arm E, formed on the hub part A opposite its wing D. Now it will be seen that by the arrangement described the two parts of the cam can readily be moved in engagement with one another by slipping the parts toward each other from opposite sides of the cam-shaft B, so as to engage the cam-arms E and E' with their dovetailed grooves $D^5$ and $D^4$, respectively. The keys C and C' are then inserted at the joint of the hub parts, to hold the latter in place and prevent lateral displacement of one hub part relatively to the other.

In order to insure a positive fastening or tightening of the cam on the shaft B, we employ a curved tightening-wedge F, fitting upon the shaft and into recesses $A^2$ and $A^3$, respectively, formed in the hub parts A A', respectively, at one of the joints thereof, as is plainly illustrated in Fig. 1. The base of this wedge F is formed with an inwardly-extending lug F', engaging a correspondingly-shaped recess B' in the shaft B. The wedge F is preferably of a width corresponding to the width of the hub, and the wedge is placed in position on the shaft previous to moving the sections of the cam in engagement with each other, as above explained. Now it will be seen that when the cam rotates in the direction of the arrow $a'$ then the pressure against the cam-wings D and D' is in the inverse direction of the said arrow $a'$, whereby the wedge F is tightened on the shaft B, and consequently the cam-sections are securely held in position, and the harder the pressure the more tightly they are fastened on the shaft.

Having thus fully described our invention, we claim as new and desire to secure by Letters Patent—

1. A cam, comprising two hub-sections each provided with a cam-wing and arm arranged in the same plane and projecting in opposite directions from the hub-section, the wings and arms of the sections being provided with interlocking projections and grooves in their inner edges, and keys in the hub-sections at their joints substantially as described.

2. A cam, comprising two hub-sections, having their meeting edges grooved and each provided with a cam-wing and arm arranged in the same plane and projecting in opposite directions from the hub-section, the arms being provided with dovetail projections on their inner edges and the wings with correspondingly-shaped grooves to receive the said projections, and keys in the grooves of the hub-sections, substantially as described.

3. The combination with a shaft provided with a recess, of a cam formed by two hub-sections, each having a recess in its bearing and provided with a cam-wing and arm projecting in opposite directions, said wings and arms being provided with interlocking projections and grooves on their inner edges, keys in the hub-sections at their joints, and a curved wedge on the shaft and provided with a lug at its base fitting in the recess of the shaft, substantially as described.

GEORGE WILLIAM RAVENSCROFT.
NILS LUDWIG MAGNUSSON.

Witnesses:
E. PETERSON,
WM. SMITH.